(12) United States Patent
Rösler

(10) Patent No.: US 7,097,379 B2
(45) Date of Patent: Aug. 29, 2006

(54) LOCKING MECHANISM ON A HOLDING DEVICE OR A PACKAGE

(76) Inventor: Peter Rösler, Ifenweg 3, D-88239 Wangen (DE)

( * ) Notice: Subject to any disclaimer, the term of this patent is extended or adjusted under 35 U.S.C. 154(b) by 0 days.

(21) Appl. No.: 10/694,455

(22) Filed: Oct. 27, 2003

(65) Prior Publication Data

US 2004/0173614 A1 Sep. 9, 2004

(30) Foreign Application Priority Data

Feb. 27, 2003 (DE) ................ 103 08 825

(51) Int. Cl.
*F16D 9/00* (2006.01)
(52) U.S. Cl. ............... 403/2; 403/11; 403/13; 206/1.5
(58) Field of Classification Search ............ 206/1.5, 206/308.2, 387.11, 807; 220/323, 324, 326; 292/80, 81, 87, 16, 346, DIG. 2; 403/2, 403/11, 13, 326, 329; 24/704.1
See application file for complete search history.

(56) References Cited

U.S. PATENT DOCUMENTS

| 4,067,482 A | | 1/1978 | Vogel et al. | |
|---|---|---|---|---|
| 4,212,415 A | * | 7/1980 | Neely | 220/324 |
| 4,567,983 A | * | 2/1986 | Morris | 206/387.11 |
| 4,572,369 A | * | 2/1986 | Morris | 206/387.11 |
| 4,822,964 A | * | 4/1989 | Koch | 200/303 |
| 5,148,914 A | * | 9/1992 | Budert et al. | 206/1.5 |
| 5,544,751 A | * | 8/1996 | Klodt et al. | 206/509 |
| 5,577,779 A | * | 11/1996 | Dangel | 220/326 |
| 5,699,601 A | * | 12/1997 | Gilliam et al. | 403/329 |
| 6,213,330 B1 | * | 4/2001 | Rufo et al. | 206/1.5 |
| 6,241,092 B1 | * | 6/2001 | Vasudeva | 220/326 |
| 2002/0175090 A1 | * | 11/2002 | Garcia, Jr. | 206/1.5 |

FOREIGN PATENT DOCUMENTS

| CH | 6 67 059 A5 | 7/1985 |
|---|---|---|
| DE | 75 14 807 U1 | 5/1975 |
| EP | 0210138 B1 | 7/1986 |

OTHER PUBLICATIONS

German Search Report.

* cited by examiner

*Primary Examiner*—Robert J. Sandy
*Assistant Examiner*—Ruth C. Rodriguez
(74) *Attorney, Agent, or Firm*—Frederick L. Tolhurst, Esq.; Cohen & Grigsby, P.C.

(57) ABSTRACT

A locking mechanism on a container (1) or a holding device (28), having two interlockable parts (33, 21, 26), wherein one part (2, 21) forms an interlocking recess (9) and the mating part (3, 26) an interlocking tongue (6). In the opening path of the interlocking tongue, a blocking element (8) is provided, as a result of which the interlocking tongue (6) can only be set to the opening position after removing the blocking element by means of a suitable tool.

20 Claims, 3 Drawing Sheets

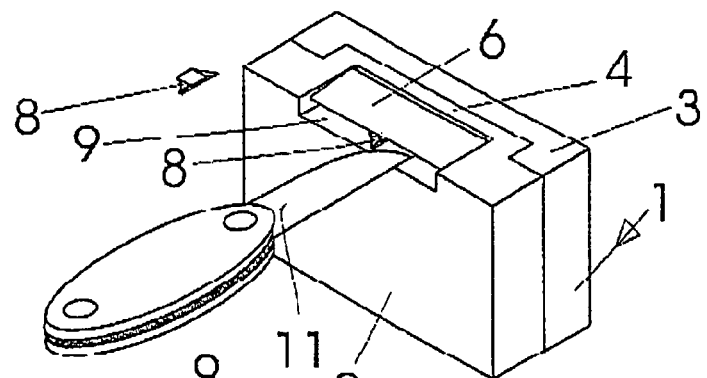
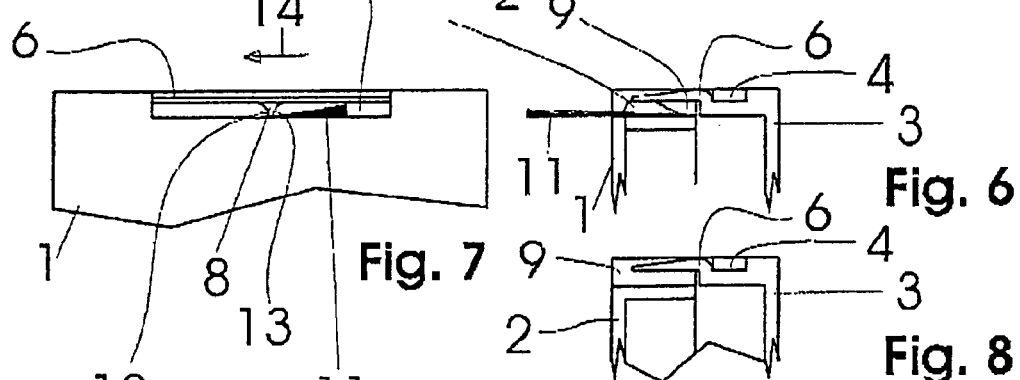
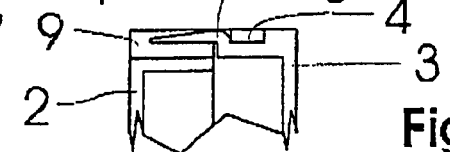
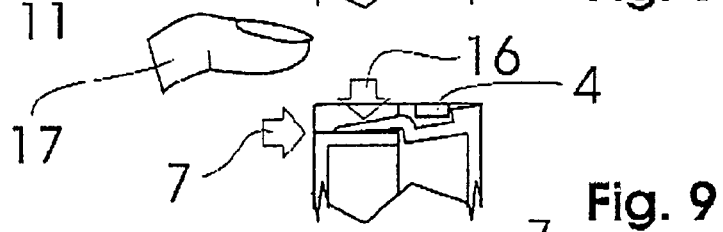
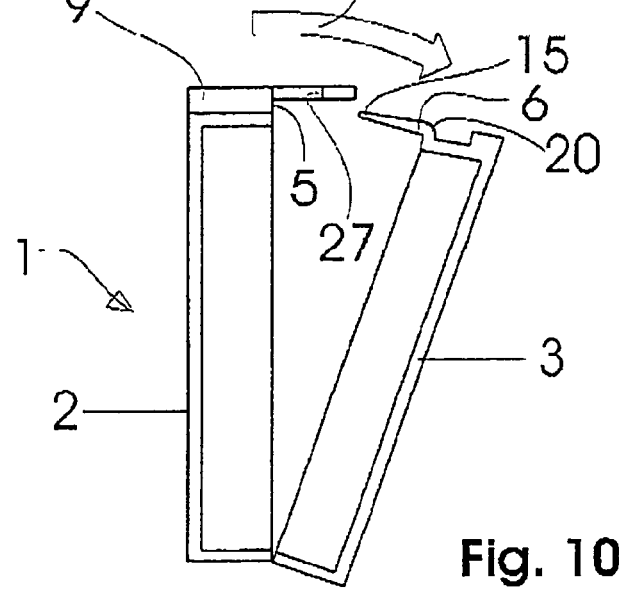

LOCKING MECHANISM ON A HOLDING DEVICE OR A PACKAGE

BACKGROUND OF THE INVENTION

1. Field of the Invention

The present invention concerns a locking mechanism on a holding device or a package.

2. Discussion of the Prior Art

In self-service stores, some merchandise is supposed to be stored in a theft-proof manner on a holding device or in a package. For the purposes of this present invention, the term "theft-proof" only means that opening the holding device or the package is made more difficult and, in particular, impossible without using tools or any other auxiliary means. Unauthorized opening of the holding device or package is also supposed to cause sufficient damage to the package to make such damage easily visible for the checkout staff.

Containers with a locking mechanism are generally known from prior art. Such containers are used, for example, as cartridges for drill bits in self-service stores. To prevent the container from being opened in the store and the drill bits contained therein, which are relatively expensive, being replaced with less expensive drill bits, a plastic plug is provided between the two container parts which overlap in the locked position, which secures the two container parts in the locked position.

The plastic plug is easily visible, which allows the checkout staff to verify whether it has been removed or severed. This arrangement, however, is disadvantageous insofar as the plastic plug is provided as a separate part on the container outside of the locking mechanism, which complicates both manufacturing and handling.

SUMMARY OF THE INVENTION

The object of this present invention is therefore to provide a protective device on a container which is significantly simpler and cheaper.

To achieve this goal, this present invention is characterized in that the protective device is provided on the locking mechanism.

For that purpose, it is significant that the locking mechanism comprises two parts which interlock, wherein one part forms an interlocking recess and the mating part an interlocking tongue. In the opening path of the interlocking tongue, a blocking element is provided, as a result of which the interlocking tongue can only be set to the opening position after removing the blocking element.

In accordance with this present invention, the prior-art plastic plug, which is separate from and provided outside of the locking mechanism, is replaced by a blocking element which is integrated in the locking mechanism.

The arrangement disclosed offers the significant advantage that a simple, theft-proof locking mechanism is provided which offers proper protection against undesired opening.

As a matter of fact, the above-referenced blocking element which is provided in the opening path of the interlocking tongue can only be removed by using a pointed tool, in particular a knife blade, which is necessary to move the interlocking tongue into its opening position and open the latching mechanism.

In other words, this present invention generally concerns a latching mechanism which can only be opened by using a tool to remove a blocking object disposed in the opening path of the interlocking tongue.

In a first preferred embodiment hereof, the blocking element is a plastic blocking element which is provided in a single piece with and connected with one container part, wherein such blocking element is preferably made from the same plastic material as the locking mechanism itself.

In another embodiment hereof, however, although the blocking element is provided in a single piece with and made from the same material as the locking part, the two parts are made from materials with different colors. For example, while the locking part may be made from a white or transparent plastic material, the blocking element which is molded on such locking part may be made from a conspicuously red plastic material.

The blocking element may be molded onto one latching part of the latching mechanism by using, for example, a plastic injection molding process.

The removable blocking element, however, may also be provided in two parts and connected to one part of the latching mechanism by using auxiliary means, e.g. an adhesive, screws, rivets, and the like.

The blocking element is preferably provided with inclined areas which guide the knife blade to be placed onto the blocking element to the bottom of the interlocking recess to ensure thorough and safe (as well as complete) separation of the blocking element. This prevents the blocking element from being only partially separated, in which case the latching mechanism could not be opened.

This present invention is not merely limited to the arrangement of a single blocking element in the opening path of an interlocking tongue. Several blocking element can be arranged side by side, all of which must be removed by using a suitable tool, whenever necessary.

In a preferred embodiment of this present invention, such a locking mechanism is installed on a closed container storing any desired objects. The container—which is preferably transparent or semi-transparent—is displayed in a show room, and customers purchase the container together with the object contained therein.

Customers remove the blocking element at home by using a suitable tool (knife).

In another preferred embodiment, the locking mechanism in accordance with this present invention is installed on a holding device which, in a manner in and by itself known from prior art, is suspended on the wall of a self-service show room. On this holding device, a locking mechanism in accordance with this present invention can also be installed, wherein such locking mechanism comprises essentially a tongue which can be pivoted with respect to the holding device and whose front end is provided by the interlocking tongue in accordance with this present invention which interlocks with a mating interlocking recess on the opposite part of the holding device and which is secured with the locking mechanism in accordance with this present invention.

This present invention is therefore not limited to the arrangement of the locking mechanism in accordance with this present invention on a closed container or a holding device and rather concerns all applications whose purpose is to protect a latching mechanism against undesired opening.

Other objects, details, advantages of the presently disclosed invention will become apparent to those skilled in the art as a detailed description of several preferred embodiments proceeds.

BRIEF DESCRIPTION OF THE DRAWING

Below, the invention shall be explained in more detail with reference to the drawings, which show different embodiments hereof. The drawings and their descriptions disclose further characteristics and benefits of this present invention.

FIG. 5: depicts the container shown in FIG. 1 during removal of the blocking element;

FIG. 6: is a schematic sectional view during removal of the blocking element;

FIG. 7: represents the front view of the representation shown in FIG. 6;

FIG. 8: is a section through the locking mechanism once the blocking element has been removed;

FIG. 9: presents the opening procedure shown in FIG. 8;

FIG. 10: depicts the opening of the container; and

DESCRIPTION OF A PRESENTLY PREFERRED EMBODIMENT

In general, FIGS. 1 through 10 show a container 1 to be opened, which comprises two parts 2, 3 which are connected with each other in a pivotable manner. Inside the container 1, any desired object may be stored.

Figure 1:
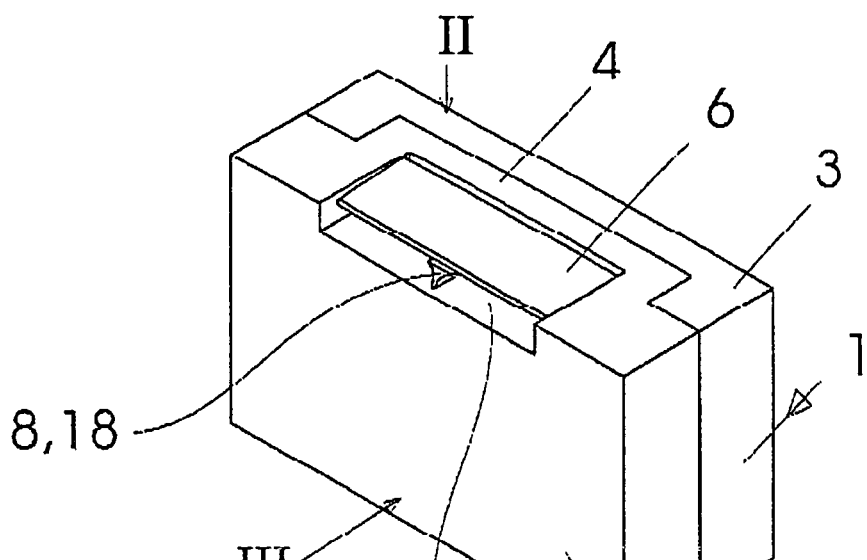
FIG. 1: is a perspective side view of a container with a locking mechanism.

In accordance with this present invention, the container is locked by means of a latching mechanism which essentially comprises a deepened recess 9 on part 2 which is formed by side walls which are provided parallel to and spaced from each other and perpendicular to and through a bottom surface in part 2. The rear end of the recess 9 forms a slot 5; towards the front, the recess 9 is readily accessible, as shown in FIGS. 1 and 5.

Figure 3:
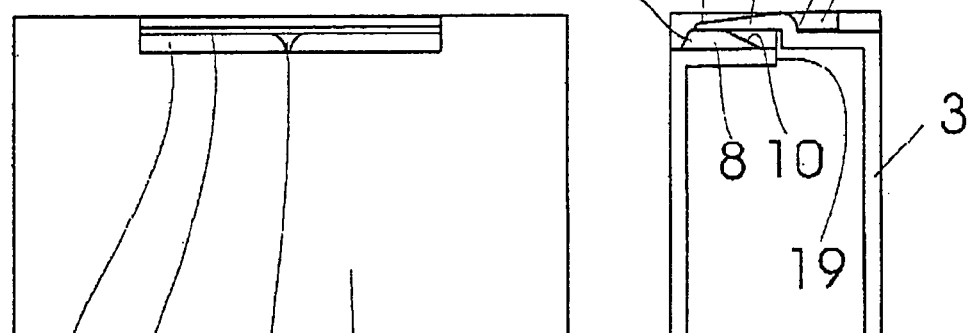
FIG. 3: represents a front view of the container in the direction of the arrow III in FIG. 1.
Figure 4:
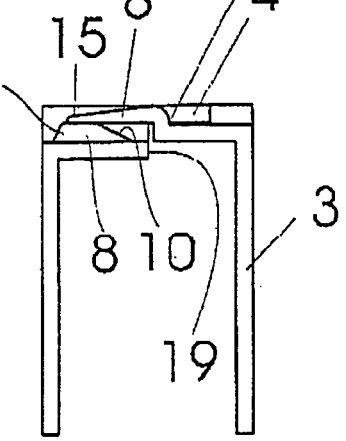
FIG. 4: shows a section through the latching mechanism for the container shown in FIG. 1.

As shown in FIGS. 4 and 10, onto the other part 3 of the container 1, an interlocking tongue 6 has been molded whose free front end forms an insertion slope 15. Both parts 2, 3 are pivotable with respect to each other, and to lock the container, part 3 is basically guided against the direction of the arrow 7 as per FIG. 10, as a result of which the interlocking tongue 6 passes through the slot 5 below the ridge 4 on the opposite part 2 and engages in the recess 9. The locking position is shown in FIGS. 1 through 4, for example.

They show that locking is achieved insofar as in the upper area of the interlocking tongue 6, a holding edge 20 is provided which interacts with an associated holding edge 27 in the area of the ridge 4, engaging in the same.

As shown in FIG. 4, the tip of the interlocking tongue 6 comes to rest on a blocking element 8 arranged on the bottom surface of the recess 9. In the direction of insertion, such blocking element 10 has a slope 10 to ensure that the interlocking tongue 6 comes to rest on the surface of the blocking element 8, where it is secured in place by spring force.

Figure 2:
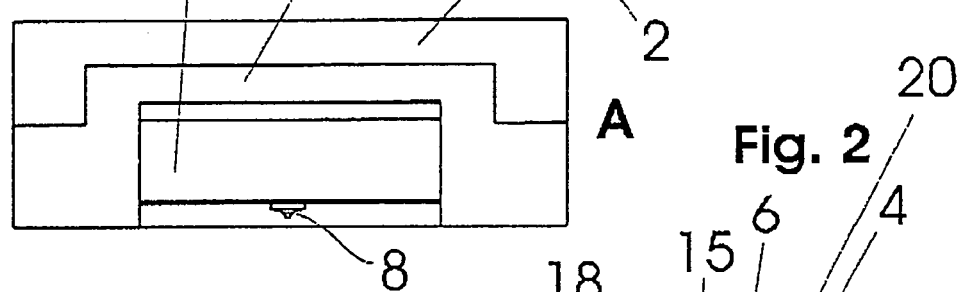
FIG. 2: represents a top view onto the container in the direction of the arrow II in FIG. 1.

FIG. 4 and FIGS. 2 and 3 furthermore show that the blocking element 8 has a front side 18 which is beveled and which is pulled beyond the front edge of the interlocking tongue 6, which makes it obvious whether the blocking element 8 is still in place or not.

The blocking element may even be provided in a different color from the material of the container 1 to make the presence of this blocking element particularly conspicuous.

FIG. 4 shows that by exercising pressure from the top onto the interlocking tongue 6, the container can not be opened since the blocking element 8 is disposed in the opening path of the interlocking tongue 6.

To open the container 1, a blade 11 must be inserted into the recess 9.

In the direction towards the front side 18, the blocking element 8 forms a roughly equilateral triangle whose triangular tip is molded into the bottom of the recess 9.

This provides a relatively thin separation ridge which can be easily separated by using the blade 11. FIGS. 6 and 7 illustrate how the container is opened. For that purpose, the blade 11 is inserted from the side into the blocking element 8 in the direction of the arrow 14, i.e. against the thin ridge provided on the bottom of the recess 9, thereby separating the ridge.

In this manner, the blocking element 8 can be easily removed from the recess 9 since it is not connected to any other elements by further measures.

The blocking element can then be removed by shaking the container or pushing it out or in another manner. FIG. 8 shows that, after removing the blocking element 8, the opening path is open to push down the interlocking tongue 6. Accordingly, the interlocking tongue 6 can be pushed down in the direction of the arrow 16 with the finger tip 17, as a result of which the holding edge 20 on the interlocking tongue 6 disengages from the holding edge 27 on the ridge 4.

The latching mechanism is then opened as shown in FIG. 10; the two parts can be swiveled apart in the direction of the arrow 7.

FIG. 7 shows that, in a front view, the blocking element 8 forms two roughly uniform downward slopes 12, 13.

Figure 11:
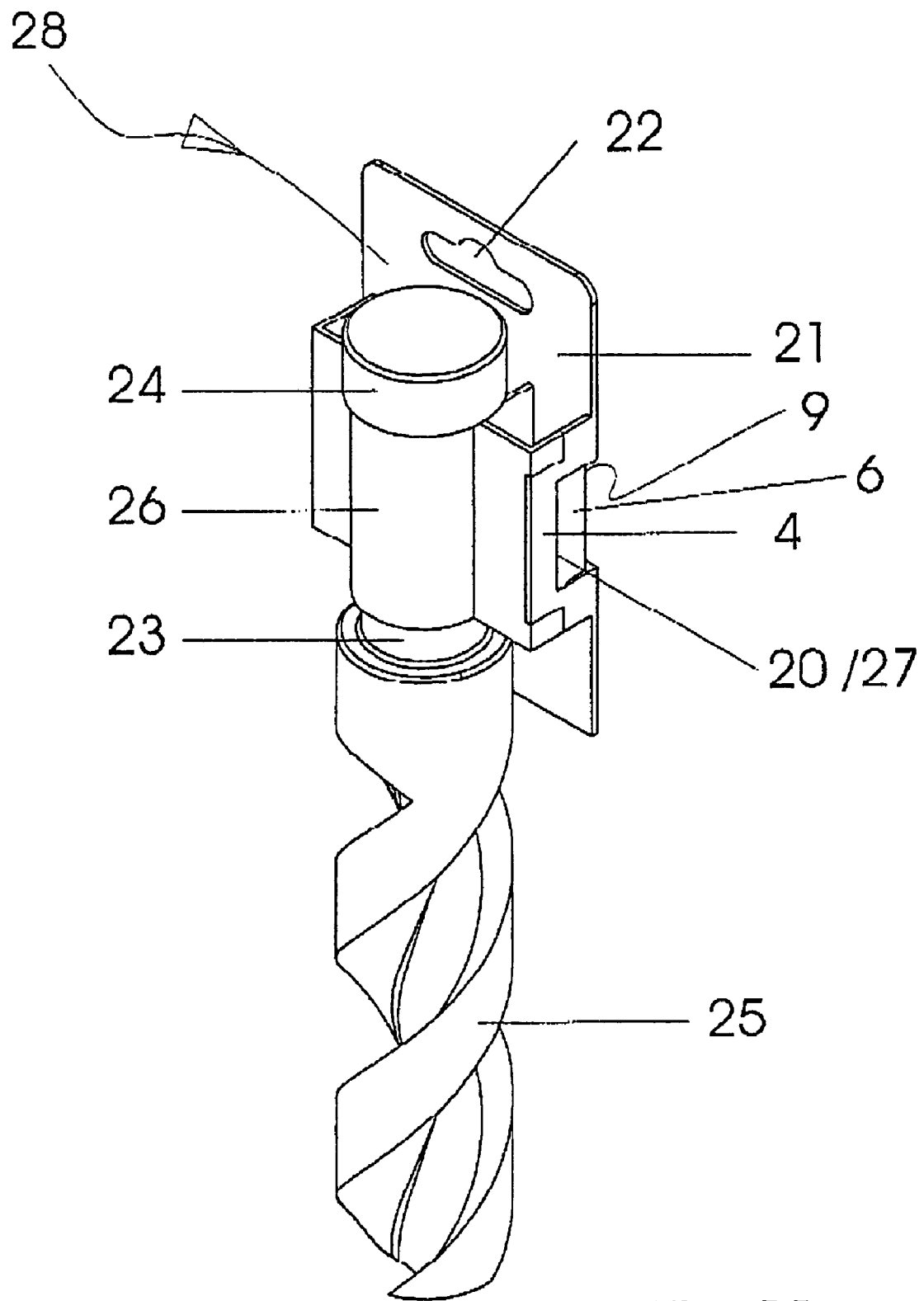
FIG. 11: is a perspective view of another embodiment of this present invention, wherein the locking mechanism is installed on a holding device.

FIG. 11 shows another embodiment hereof, wherein the locking mechanism in accordance with this present invention is installed on a conventional holding device 28.

Such holding device 28 may either have two walls or a single wall and has a suspension hole 22 by means of which the device is secured on a suspension wall in a store.

The holding device 28 holds a drill bit. In the sample embodiment shown herein, on the holding, a top cap 24 has a wider diameter. In addition, a lower expanded part 25 is provided in the form of the blade of the drill bit 23 which has a wider diameter than the shaft. In this manner, the drill bit 23 is secured on the holding device 28 and can not move with respect to the same. The purpose of this arrangement is to ensure that the drill bit 23 can neither be pulled towards the top nor towards the bottom out of the tongue 26. In the sample embodiment shown herein, the mechanism which prevents dislocation towards the top is represented by the top expanded part 24 on the holding device against which the front part of the drill abuts, and the mechanism which prevents dislocation towards the bottom is represented by the expanded part of the drill bit.

Between these expanded parts 24, 25, in the area of the narrower section of the drill bit 23, the locking mechanism in accordance with this present invention is disposed. It essentially comprises a tongue 26, connected to the holding plate 21 in pivotable manner, wherein, on the free front end of such tongue 26, the above-mentioned interlocking tongue 6 is arranged. As described earlier, this interlocking tongue 6 is pivoted into the interlocking recess 9, as a result of which the above-mentioned holding edge 20 engages with the holding edge 27 provided on the opposite ridge.

In the opening path of such interlocking tongue 6, in turn, the blocking element (not shown in this drawing) which has been described earlier with respect to the drawings FIGS. 1 through 10 is disposed, and such blocking element must first be removed by means of a tool (blade 11) to be able to open the tongue 26 and remove the drill bit 23 from the holding device 28.

Certainly, it is also possible not to suspend the holding device 28 on a surface, but rather firmly secure the same on a surface to make theft of the object together with the holding device more difficult.

It is also possible to install the locking mechanism in accordance with this present invention on all other holding devices that are suitable to protect an object against removal.

Whereas, according to this present invention, a locking mechanism made from plastic is preferred, this invention, however, is not limited thereto. It is also conceivable to manufacture the entire latching mechanism from a metallic material, in which case the blocking element to be removed by using a tool would need to be connected with the material of the latching mechanism as a separate part.

Insofar as the sample embodiment shown in FIG. 11 is concerned, it is advantageous to make the holding device 28 reusable. Once a customer has purchased the drill bit 23 together with the holding device 28, the drill bit will be removed by removing the blocking element 8 from the holding device 28. Afterwards, customers can still use this holding device 28 as a suspension device for the drill bit 23 to be secured.

LEGEND

1 Container
2 Part
3 Part
4 Ridge
5 Slot
6 Latching Tongue
7 Direction of the Arrow
8 Blocking Element
9 Recession
10 Slope
11 Blade
12 Slope
13 Slope
14 Direction of the Arrow
15 Insertion Slope
16 Direction of the Arrow
17 Finger Tip
18 Front Side
19 Contact Edge
20 Holding Edge
21 Holding Device
22 Suspension Hole
23 Drill Bit
24 Cap
25 Expanded Part
26 Tongue
27 Holding Edge
28 Holding Device

I claim:

1. A locking mechanism for a container or a holding device, said locking mechanism comprising:

a first part that defines a recess having a holding surface and a bottom surface;

a second part that cooperates with said first part in interlocking relationship, said second part defining a tongue that cooperates with the holding surface of said recess to secure said first part to said second part, said second part being releasable from said first part by deflecting said tongue toward the bottom surface of said recess;

a blocking element that is located between said bottom surface of said first part and the tongue of said second part, said blocking element being severably connected to one of said tongue or the bottom surface of said recess by a connector that is severable such that said blocking element blocks the deflection of said tongue toward the bottom surface of said recess at times when said connector is unsevered and, said blocking element is secured to one of said tongue or the bottom surface of said recess, and such that said tongue is deflectable toward the bottom surface at times when said connector is severed and said blocking element is removed from between said tongue and said bottom surface; and a tool that includes a blade for severing said connector of said blocking element from the tongue of said second part or from the bottom surface of the recess of said first part, said blocking element defining sloped surfaces that cooperate with said blade to guide the blade to an area of said blocking element that is adjacent to the bottom surface of the recess of said first part.

2. The locking mechanism of claim 1 wherein said blocking element is comprised of the same material as said second part and wherein said blocking element and said second part are connected by an integral ridge.

3. The locking mechanism of claim 1 wherein the portion of said second part that defines said tongue, the portion of said first part that defines said recess, and said blocking element are made of a plastic material.

4. The locking mechanism of claim 3 wherein the plastic material of the blocking element is the same type of material as the plastic material of the tongue and the portion of said first part that defines said recess.

5. The locking mechanism of claims 3 or 4 wherein said first part includes a ridge member that defines the holding surface of said first part and wherein said ridge member and said blocking element are molded onto said first part by means of plastic injection molding.

6. The locking mechanism of claims 3 or 4 wherein said tongue and said blocking element are molded onto said second part by means of plastic injection molding.

7. The locking mechanism of claim 1 wherein the blocking element is a separate member that is secured to one of the tongue of said second part or the recess of said first part by fastening means.

8. The locking mechanism of claim 7 wherein said fastening means is selected from the group of gluing, screwing and riveting.

9. The locking mechanism of claim 1 wherein the blocking means is connected to the bottom surface of the recess of the first part.

10. The locking mechanism of claim 1 wherein said blocking element comprises an array of separate elements, each element of said array blocking deflection of the tongue in the direction toward the bottom surface of the recess.

11. The locking mechanism of claim 10 wherein a tool is required to separate each element of the array from one of said first part or said second part.

12. The locking mechanism of claim 10 or 11 wherein the elements of said array of blocking elements are arranged in side-by-side relationship.

13. The locking mechanism of claims 10 or 11 wherein the elements of said array of blocking elements are arranged in end-to-end relationship.

14. The locking mechanism of claims 1, 4, 3, 4, 7, 8, 9, 10, or 11 wherein said container is a closed container in which objects can be stored.

15. The locking mechanism of claims 1, 4, 3, 4, 7, 8, 9, 10, or 11 wherein said locking mechanism is for a holding device, said first part comprising a holding plate and said second part comprising a tongue that is that is pivotally connected to the holding plate, said tongue including an interlocking tongue that engages a surface of the recess on the holding plate to secure the tongue to the holding plate.

16. The locking mechanism of claims 1, 3, 4, 7, 8, 9, 10, or 11 wherein said locking mechanism can be repeatedly opened and closed at times when the blocking element is not in place between the first part and the second part.

17. The locking mechanism of claims 1, 4, 3, 4, 7, 8, 9, 10, or 11 wherein said blocking element has a cross-section in the general shape of a triangle with one edge of said triangle being secured to one of said first part or said second part.

18. A locking mechanism for a container or a holding device, said locking mechanism comprising:
- a first part that defines a recess having a holding surface and a bottom surface;
- a second part that cooperates with said first part in interlocking relationship, said second part defining a tongue that cooperates with the holding surface of said recess to secure said first part to said second part, said second part being releasable from said first part by deflecting said tongue toward the bottom surface of said recess; and
- a blocking element that is located between said bottom surface of said first part and the tongue of said second part, said blocking element having a cross-section in the general shape of a triangle with one edge of said triangle being secured to one of said first part or said second part, said blocking element being severably connected to one of said tongue or the bottom surface of said recess by a connector that is severable such that said blocking element blocks the deflection of said tongue toward the bottom surface of said recess at times when said connector is unsevered and said blocking element is secured to one of said tongue or the bottom surface of said recess, and such that said tongue is deflectable toward the bottom surface at times when said connector is severed and said blocking element is removed from between said tongue and said bottom surface.

19. The locking mechanism of claim 18 further comprising a tool that severs said connector of said blocking element from the tongue of said second part or from the bottom surface of the recess of said first part.

20. The locking mechanism of claim 19 wherein said tool includes a blade for severing said connector of said blocking element.

* * * * *